United States Patent Office 2,745,807
Patented May 15, 1956

2,745,807
LIQUID FIRE EXTINGUISHING COMPOSITION

Charles Anthony, Jr., East Orange, and Robert Thomann, Jr., Clifton, N. J., assignors to Specialties Development Corporation, Belleville, N. J., a corporation of New Jersey No Drawing. Application December 5, 1952,
Serial No. 324,402

4 Claims. (Cl. 252—2)

The present invention relates to fire extinguishing compositions, and, more particularly, to aqueous compositions which are usable as a liquid at sub-zero temperatures.

Accordingly, an object of the invention is to provide a composition of this type which extinguishes fires rapidly and effectively.

Another object is to provide such a composition which is serviceable at about $-65°$ F. and can be readily discharged and directed on a fire at such temperature.

A further object is to provide such a fire extinguishing composition which can be stored for long periods of time without depreciation of its serviceability.

A still further object is to provide such a composition which is useful in preventing the occurrence and spreading of fires.

Other and further objects of the invention will be obvious upon an understanding of the illustrative embodiment about to be described, or will be indicated in the appended claims, and various advantages not referred to herein will occur to one skilled in the art upon employment of the invention in practice.

In accordance with the invention, it has been discovered that the foregoing objects can be accomplished by providing a fire extinguishing composition consisting essentially of a water solution containing between 40% and 45% by weight zinc chloride, and between 5% and 15% by weight of at least one halide selected from the group consisting of calcium bromide, lithium iodide, and zinc bromide, the solution containing between 50% and 55% by weight of these materials.

The following examples illustrate compositions according to the present invention:

Example I

| | Percent by weight |
|---|---|
| Zinc chloride | 45 |
| Zinc bromide | 5 |
| Water | 50 |

Example II

| | Percent by weight |
|---|---|
| Zinc chloride | 40 |
| Zinc bromide | 10 |
| Water | 50 |

Example III

| | Percent by weight |
|---|---|
| Zinc chloride | 40 |
| Calcium bromide | 10 |
| Water | 50 |

Example IV

| | Percent by weight |
|---|---|
| Zinc chloride | 40 |
| Lithium iodide | 15 |
| Water | 45 |

The foregoing compositions are prepared by dissolving the respective materials in fresh water at room temperature, and then filtering the solution to remove solid or undissolved impurities. Preferably, distilled water or water which has a relatively low mineral content is used.

It has been found that zinc chloride in water solution is a highly effective fire extinguishing material, particularly on Class A type fires, that is, burning wood, paper, rags, etc., in that it knocks down the flame almost instantly and prevents rekindling of the fire. The zinc chloride solution, at high concentrations, is rendered even more effective and serviceable at temperatures as low as about $-65°$ F. by the addition of calcium bromide, lithium iodide, or zinc bromide in the amounts specified.

In order to demonstrate the serviceability of these compositions at sub-zero temperatures, water-type fire extinguishers were charged with the respective compositions according to the aforementioned examples and were pressurized to 200 pounds per square inch with nitrogen. The extinguishers were maintained at between $-65°$ F. and $-70°$ F. for twenty-four hours, and were discharged at such temperatures. In each case, the composition was discharged as a fluid stream having a range of about thirty feet, thus demonstrating that, at such low temperatures, the usability of the compositions in connection with conventional fire extinguishing apparatus is not impaired.

Other tests were made by placing quantities of the respective compositions in open containers, and subjecting the compositions to the aforementioned temperatures for a period of about seventy-two hours. At the end of this treatment, it was found that in each case the compositions did not salt out, poured about as freely as fresh water, and did not exhibit any viscous tendencies. This accounts for the fact that rapid and efficient discharge thereof can be effected as previously mentioned.

The foregoing results could not be attained with compositions at higher or lower concentrations than those specified herein.

While the compositions in accordance with the invention are primarily intended for extinguishing Class A fires, it has been established that they also are useful to prevent the occurrence or spreading of fires. For example, in connection with craft or vehicles where a fire hazard is created upon crash or violent impact, the application of these compositions at or in the vicinity of a likely fire zone upon crash has prevented the incipience of fires, or has prevented the spreading of small fires which could then be easily extinguished. Thus, in addition to serving as fire extinguishing agents, the compositions also serve to prevent or confine fires.

From the foregoing description, it will be seen that the present invention provides useful and effective fire extinguishing compositions of the water solution type which are serviceable at about $-65°$ F.

It will be understood that the details and examples hereinbefore set forth are illustrative only and that the invention as broadly described and claimed is in no way limited thereby.

We claim:

1. A fire extinguishing composition serviceable as a free flowing liquid at about $-65°$ F. consisting essentially of a water solution of between 40% and 45% by weight zinc chloride and between 5% and 15% by weight of at least one halide selected from the group consisting of calcium bromide, lithium iodide, and zinc bromide, said solution containing between 50% and 55% by weight of said materials.

2. A fire extinguishing composition serviceable as a free flowing liquid at about $-65°$ F. consisting of a water solution containing between 40% and 45% by weight zinc chloride and between 5% and 10% by weight zinc bromide.

3. A fire extinguishing composition serviceable as a free flowing liquid at about $-65°$ F. consisting of a water solution containing about 40% by weight zinc chloride, and about 10% by weight calcium bromide.

4. A fire extinguishing composition serviceable as a free flowing liquid at about −65° F. consisting of a water solution containing about 40% by weight zinc chloride, and about 15% by weight lithium iodide.

References Cited in the file of this patent

UNITED STATES PATENTS

| | | |
|---|---|---|
| 1,633,383 | Kubierschky et al. | June 21, 1927 |

FOREIGN PATENTS

| | | |
|---|---|---|
| 22,696 | Great Britain | 1902 |
| 115,998 | Australia | Feb. 11, 1943 |